United States Patent Office 3,574,225
Patented Apr. 6, 1971

3,574,225
6-AMINOPENICILLANIC ACID
Jeffery Edward Munden, Horsham, England, assignor to Beecham Group Limited, Brentford, England
No Drawing. Filed Nov. 8, 1966, Ser. No. 592,754
Claims priority, application Great Britain, Nov. 18, 1965, 48,995/65
Int. Cl. C07d 99/18
U.S. Cl. 260—306.7      8 Claims

ABSTRACT OF THE DISCLOSURE

Procedure is provided for removing high molecular weight antigenic material from 6-aminopenicillanic acid produced at least partially by a microbiological process. The procedure is essentially carried out by making up a neutral solution of 6-aminopenicillanic acid, adding a protein denaturant such as Odex No. 1, introducing an adsorbent such as aluminum hydroxide and obtaining purified 6-aminopenicillanic acid in solution for the preparation of penicillins therefrom or recovering the 6-aminopenicillanic acid by precipitation at the isoelectric point.

---

This invention relates to a process for the purification of 6-aminopenicillanic acid.

6-aminopenicillanic acid is acylated to produce penicillins, and a number of penicillins obtained in this way have great therapeutic importance as antibacterial agents. Therefore 6-aminopenicillanic acid is a very valuable intermediate, and it is prepared by known processes involving one or more microbiological steps. In such processes high molecular weight antigenic materials such as penicilloylated proteins are produced, and these are not removed in the processes previously used to purify the resulting 6-aminopenicillanic acid. These high molecular weight antigenic impurities are found in the penicillins obtained by acylating such 6-aminopenicillanic acid, and they can cause anaphylactic shock and other adverse reactions on administration of the penicillins in man.

It is an object of the present invention to provide a process for purification of 6-aminopenicillanic acid whereby there is substantial removal of the high molecular weight antigenic impurities.

Accordingly, the present invention provides a process for removing high molecular weight antigenic material from commercial 6-aminopenicillanic acid as hereinafter defined, which process comprises treating an aqueous solution of the 6-aminopenicillanic acid with a protein denaturant and then contacting it with one or more adsorbent materials, and, if desired, recovering solid 6-aminopenicillanic acid from the solution.

By "commercial 6-aminopenicillanic acid" we mean 6-aminopenicillanic acid that has been isolated as a solid, for example by precipitation at the isoelectric point, or 6-aminopenicillanic acid in solution prepared from a penicillin that has itself been isolated as a solid, for example, obtained by enzymatic splitting of benzylpenicillin.

Examples of suitable protein denaturants include urea, thiourea, trichloroacetic acid, guanidine salts, ammonium sulphate, surfactants and proteolytic enzymes such as trypsin. Preferably surfactants are used, and particularly sodium dodecylbenzenesulphonate.

Examples of suitable adsorbents include certain clays, earths, inorganic oxides, hydroxides and salts, silicates, plastics, ion exchangers, active carbons and various organic compounds. Preferably at least two adsorbents in combination are used in the purification.

Preferably the process is carried out in an inert atmosphere, for example in nitrogen, when a slightly purer product is obtained.

In a typical purification process the 6-aminopenicillanic acid is dissolved in water by raising the pH to 7.0 with aqueous sodium hydroxide. The denaturant is added and the system steadily agitated for a suitable time after which the adsorbent (or adsorbents) is added. The mixture is agitated, then the solids are removed and either the 6-aminopenicillanic acid is recovered from the solution, for example by precipitation at the isoelectric point, or the 6-aminopenicillanic acid in solution is used directly for the preparation of penicillins.

The following examples illustrate the invention. In each case the 6-aminopenicillanic acid used had been obtained by enzymatic splitting of benzylpenicillin. The products in each example were tested in sensitised guinea pigs and did not elicit the passive cutaneous anaphylactic reactions observed with the unpurified 6-aminopenicillanic acid.

EXAMPLE 1

24 kg. of 6-aminopenicillanic acid was dissolved in water to give a 5% solution by using 5 N NaOH, and the pH was finally adjusted carefully to 7.0. Then 2% v./v. Odex No. 1 detergent (i.e. 9.61) was added and the solution was stirred fairly vigorously for 1 hour. Next 25 l. commercial Alfloc solution was slowly added, the pH being maintained at 7.0 by using 35% nitric acid. (This treatment produced $Al(OH)_3$ in situ, the $Al(OH)_3$ being the effective adsorbent.) After agitation for 30 minutes the precipitate was spun off by using a Sharples centrifuge. Then 20 kg. Darco KB carbon was added to the clarified liquors; it was removed after 30 minutes agitation by using a filter precoated with dicalite (a diatomaceous earth). If necessary the procedure was repeated to give a clear liquid. Purified 6-aminopenicillanic acid was then precipitated by lowering the pH to 4.3 with nitric acid. The 6-aminopenicillanic acid was then collected, washed and dried in the usual way. The overall yield (by hydroxylamine assay) was 51.5%, and the loss of 6-aminopenicillanic acid was 40% in the adsorbent and 7.4% in the mother liquor.

EXAMPLE 2

200 ml. of 4% 6-aminopenicillanic acid solution had urea dissolved therein until it was 8 M with respect to the urea. After agitation for ½ hour 5% w./v. adsorbent mixture was added, and the slurry was stirred for ½ hour, after which the adsorbents were filtered off by using 1% w./v. of a filter aid. The 6-aminopenicillanic acid was then recovered as described in Example 1. The adsorbent mixture contained equal proportions of fuller's earth, asbestos and Norit GSX carbon.

EXAMPLE 3

A 4% solution of 6-aminopenicillanic acid was stirred with 2% w./v. sodium dodecylbenzenesulphonate, after which 10% w./w/ adsorbent mixture was added and the slurry was stirred for ½ hour. The adsorbent mixture contained equal proportions of fuller's earth, asbestos and Norit GXS carbon. The 6-aminopenicillanic acid was then recovered as described in Example 1.

EXAMPLE 4

The method of Example 3 was carried out with the use of cetyl-trimethylammonium bromide and also of Odex No. 1 detergent as denaturing agent.

EXAMPLE 5

The method of Example 3 was repeated with use of a mixture of fuller's earth and Darco KB carbon (1:1 w./w. as the adsorbent system.

EXAMPLE 6

A 4% solution of 6-aminopenicillanic acid was stirred with 2% w./v. sodium dodecylbenzenesulphonate for 1 hour. Then 1% v./v. mercaptoethanol was added and the solution was allowed to stand for 1 hour. Next 5% w./v. of an equal proportions mixture of talc and Darco KB carbon was added. After contact time of ½ hour the adsorbents were filtered off and the 6-aminopenicillanic acid was recovered as described in Example 1.

EXAMPLE 7

All operations were carried out in a nitrogen atmosphere and all liquid streams had nitrogen bubbled through them. Two litres of 5% 6-aminopenicillanic acid solution (pH 7.5) were treated with 12.5% v./v. of 12.5% w./v. Alfloc solution, the pH being maintained at 7.5 with 35% nitric acid. This slurry was vacuum filtered onto 4% Norit GSX activated carbon. After removal of the carbon by vacuum filtration, the 6-aminopenicillanic acid was precipitated by adjusting the pH of the filtrate to 4.3 with 5 N nitric acid. The product was collected, washed and dried in the usual way, and stored under nitrogen before being tested.

EXAMPLE 8

Again a nitrogen atmosphere was used as described in Example 6. In this case the Alfloc treatment was replaced by treatment with Odex No. 1 detergent and the adsorbent system was talc and Norit GSX carbon, 5% w./v. talc and 4% w./v. carbon being used. The Odex detergent contact time was 1 hour, and the other experimental details were as described in Example 6.

I claim:
1. A process for removing high molecular weight antigenic material from microbiologically produced, normally purified 6-aminopenicillanic acid, which process comprises adding a protein denaturant to an aqueous solution of the 6-aminopenicillanic acid and then contacting it with at least one adsorbent material.

2. A process as claimed in claim 1, wherein the protein denaturant is sodium dodecylbenzenesulphonate, Odex No. 1 urea, or cetyltrimethylammonium bromide.

3. A process as claimed in claim 1, wherein the at least one adsorbent is fuller's earth, talc, asbestos, aluminum hydroxide or activated carbon.

4. A process as claimed in claim 3, wherein at least two adsorbents are used in combination.

5. A process as claimed in claim 1, wherein purification is effected in an inert atmosphere.

6. A process for removing high molecular weight antigenic material from 6-aminopenicillanic acid wherein the 6-aminopenicillanic acid is solid and isolated or is in solution.

7. A process as claimed in claim 1, wherein the 6-aminopenicillanic acid is recovered substantially free of high molecular weight antigenic material.

8. A process as claimed in claim 1, wherein the solution of 6-aminopenicillanic acid is adjusted to neutral pH, Odex No. 1 is the protein denaturant, $Al(OH)_3$ is the adsorbent and the purified 6-aminopenicillanic acid is obtained in solution for the preparation of penicillins therefrom or is recovered from the solution by precipitation at the isoelectric point.

References Cited

UNITED STATES PATENTS

| 3,028,379 | 4/1962 | Sheehan | 260—239.1 |
| 3,127,326 | 3/1964 | Lindner et al. | 260—239.1 |
| 3,272,715 | 7/1962 | Grant | 260—239.1 |
| 3,164,004 | 1/1965 | Doyle et al. | 260—239.1 |

NICHOLAS S. RIZZO, Primary Examiner

U.S. Cl. X.R.

260—239.1